Figure 1:
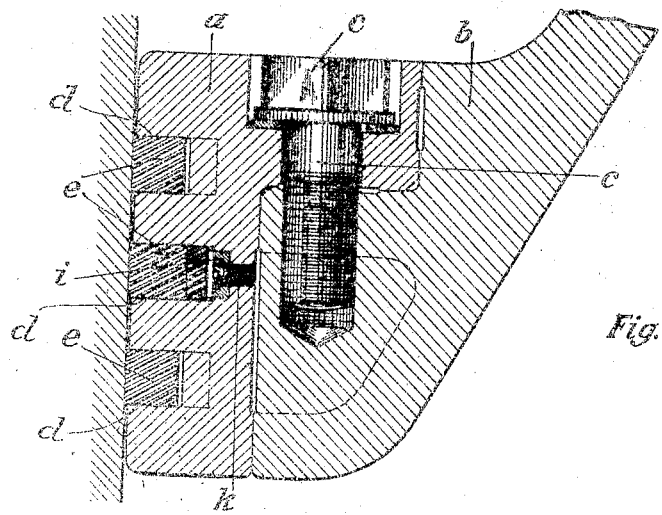

J. EGGERS.
PISTON PACKING RING.
APPLICATION FILED JUNE 2, 1915. RENEWED AUG. 8, 1919.

1,322,294.

Patented Nov. 18, 1919.

WITNESSES

INVENTOR
JULIUS EGGERS
BY
ATTORNEYS

UNITED STATES PATENT OFFICE.

JULIUS EGGERS, OF CASSEL WILHELMSHÖHE, GERMANY, ASSIGNOR, BY MESNE ASSIGNMENTS, TO LOCOMOTIVE SUPERHEATER COMPANY, A CORPORATION OF DELAWARE.

PISTON PACKING-RING.

1,322,294. Specification of Letters Patent. Patented Nov. 18, 1919.

Application filed June 2, 1915, Serial No. 31,794. Renewed August 8, 1919. Serial No. 316,181.

*To all whom it may concern:*

Be it known that I, JULIUS EGGERS, a citizen of the German Empire, residing at Cassel Wilhelmshöhe, Germany, have invented a certain new and useful Improvement in Piston Packing-Rings, of which the following is a specification.

My invention relates to an improved piston packing ring of the elastic or self-adjusting type adapted to lie in an annular recess of the piston and provided with inwardly projecting hooked ends arranged to engage suitably formed recesses in the bottom of the annular ring.

In the prior art rings of the kind just referred to are known in which the opposite faces of the hooks, which faces engage the surfaces of the recesses in the annular ring, are portions of substantially radial planes or of planes parallel with a piston diameter. With such a construction when the piston and ring are removed from the engine cylinder there is nothing to prevent the piston ring hooks becoming unseated and the ring released from the piston should said ring happen to be pushed into the bottom of the annular recess on the side opposite the hooks.

It is the purpose of the present invention to do away with the disadvantage above set forth by providing the body of the piston with undercut (notched) grooves or the equivalent and the ends of the piston ring with corresponding hooks or projections which engage said notches so as to limit the expansion of the ring and secure it in position without holding it rigidly. If the ring is slipped over the piston by expanding it to a diameter somewhat greater than the inside diameter of the cylinder, the end hooks, under the influence of the elasticity of the ring, will automatically slip into the notches from which they cannot be dislodged except by forcing the ends of the ring together and then displacing the entire ring radially by pressure upon the side opposite the hooks.

If, in the course of time, the wear on the running surface of the ring makes the readjustment of its expansion quality necessary, one only needs to reverse the process just described in order to remove the ring from the piston. To accomplish this the ring is compressed to such an extent that by pushing the ring over radially across the piston, the hooks will slip out of the grooves and the ring may then be taken out of the piston in the usual manner.

The readjustment necessary to permit a greater expansion of the ring is obtained by filling or other equivalent operation upon the hooks. The insertion and removal of the rings as well as the refitting of the interlocking parts may be quickly performed and requires only a limited amount of skill. The filling or other treatment of the surface need only be done in crude fashion, because there is no question of exactly fitting the ring; it is only necessary to remove sufficient material to permit the further degree of expansion desired.

The hooks or projections may either be placed at the extreme ends of the ring or, if desired, at some other convenient point on the inner circumference of the ring.

Figure 2:
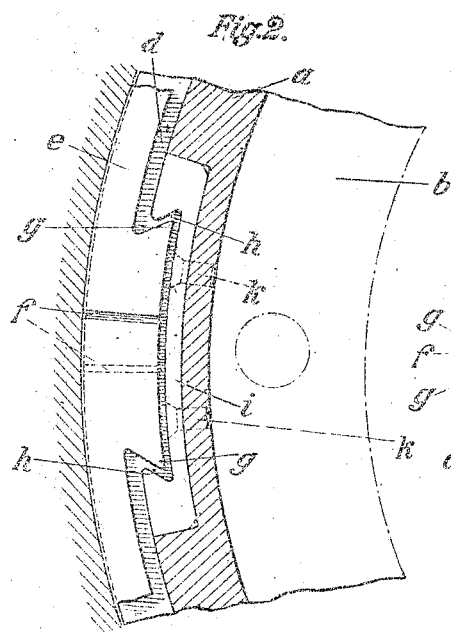
Figure 3:
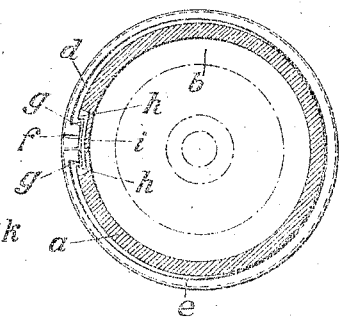

My invention will be better understood by referring to the accompanying drawing in which Figure 1 shows a part of the piston in axial longitudinal section; Fig. 2 shows a partial cross section thereof; and Fig. 3 a cross section of the entire piston on a reduced scale.

In the drawing the piston is one of a usual type. It comprises an annular shell *a* which is removably fastened to the piston body *b* by screws *c* and is provided with three annular recesses or grooves *d* for the reception of the piston rings *e*; these rings have their abutting ends displayed with reference to one another as usual. The ends of each ring, at the joint *f*, are provided with two inwardly projecting hooks or noses *g* which engage corresponding undercut notches *h* in the ring or shell *a*. These notches *h*, in the embodiment represented, are formed in a special insert piece *i*, for purposes of convenience in manufacture, which is removably fastened to the shell *a* by screws *k*. As shown in the figures, the piston is in its cylinder and the ring is fitted so that it is able to expand and contract with variations in diameter of said cylinder. The ring is securely held in position by means of the hooks *g* which cannot escape from the notches *h* but which in no way lessen the elasticity of the ring necessary for the smooth running of the machine, since the same can be pressed together by an amount corresponding to the separation of its ends. As wear on the running surface of the ring c continues, the space between the hooks g and the corresponding surfaces of the notches h becomes smaller until finally the hooks will lie directly upon the notches so that hooks and end surfaces are pressed together. If any leakage takes place with further running of the machine one needs only to file away the engaging surfaces of the hooks or of the notches sufficiently to permit the further desired expansion of the ring. To accomplish this the ring ends are pressed together and the entire ring pushed over from the opposite side of the piston so as to free the hooks from the notches.

The rings may be made eccentric in the usual manner for the purpose of securing greater strength and elasticity. In this case the grooves, in order to properly take in the rings, must be deepened corresponding to the eccentricity. The rings will have their greatest thickness and tension opposite the notches h. The use of such eccentric rings provided with hooked ends does not entail any special difficulties. In making them by means of a milling machine e. g., the outer circumference is first prepared and then the ring is suitably displaced radially with reference to the ring and the inner circumference prepared. Finally the hooks themselves may be formed.

The invention is obviously not limited to the embodiment represented. The notches in the piston body and the hooks or projections on the piston rings may have any preferred undercut or equivalent form and as previously mentioned may be placed at any desired position upon the inner circumference of the ring.

Having described my invention, I claim:

1. In an engine, the combination of a piston having an annular recess, there being formed in the bottom of said recess a second recess having oppositely undercut ends, and an elastic piston ring in the first recess having ends provided with hooks complementary to and adapted to engage said undercut ends, the peripheral distance between the points of the hook when the ring ends are pressed together being less than the peripheral distance between the points of the undercut ends and the diameter of the piston at the bottom of the recess being substantially less than the inner diameter of the ring when compressed to a degree such that the distance between the points of the hooked ends is just barely less than the distance between the points of the undercut ends of said second recess.

2. In an engine, the combination of a piston having an annular recess, a detachable but normally fixed insert piece fitted into the bottom of said recess said piece being itself provided with a recess having oppositely undercut ends, and a split elastic piston ring in the first recess provided with hooks complementary to and adapted to engage with the undercut ends of the insert piece.

3. In a piston, in combination, a spring packing ring having a dovetailed projection upon its inner side, said ring being divided through said projection and the two ends thus formed being normally separated circumferentially but adapted to be mutually approached by compressing the ring and a lock piece fixed in the piston body opposite the dovetailed projection, said lock piece having a recess the form of which is complementary to the dovetailed projection, the dimensions of the piston body, ring, and recess, being such that the recess will admit the projection when the ring is compressed and retain the ring in position when the ring is permitted to expand as and for the purpose described.

In testimony whereof I have hereunto set my hand in the presence of two subscribing witnesses.

JULIUS EGGERS.

Witnesses:
JULIUS FRANKE,
CARL MOLL.